US008418348B2

(12) United States Patent
Tonami

(10) Patent No.: US 8,418,348 B2
(45) Date of Patent: Apr. 16, 2013

(54) MANUFACTURING METHOD OF SCATTERED RADIATION REMOVING GRID

(75) Inventor: Hiromichi Tonami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 343 days.

(21) Appl. No.: 13/001,690

(22) PCT Filed: Jul. 22, 2008

(86) PCT No.: PCT/JP2008/063127

§ 371 (c)(1),
(2), (4) Date: Dec. 28, 2010

(87) PCT Pub. No.: WO2010/010607

PCT Pub. Date: Jan. 28, 2010

(65) Prior Publication Data

US 2011/0099790 A1 May 5, 2011

(51) Int. Cl.
*H01S 4/00* (2006.01)

(52) U.S. Cl.
USPC ......... 29/592.1; 29/600; 250/505.1; 378/154; 378/155

(58) Field of Classification Search ................. 29/592.1, 29/600; 250/505.1; 378/154, 155
See application file for complete search history.

(56) References Cited

U.S. PATENT DOCUMENTS

| | | | | |
|---|---|---|---|---|
| 5,721,761 | A * | 2/1998 | Ferlic et al. | 378/154 |
| 5,729,585 | A * | 3/1998 | Pellegrino et al. | 378/154 |
| 6,055,296 | A * | 4/2000 | Ferlic et al. | 378/154 |
| 6,440,527 | B2 * | 8/2002 | Prins et al. | 428/118 |
| 7,180,982 | B2 * | 2/2007 | Schneider et al. | 378/154 |
| 8,314,412 | B2 * | 11/2012 | Vogtmeier | 250/505.1 |
| 2003/0021379 | A1 * | 1/2003 | Klotz et al. | 378/154 |
| 2005/0105685 | A1 * | 5/2005 | Harding | 378/86 |
| 2005/0123099 | A1 * | 6/2005 | Schneider et al. | 378/154 |

FOREIGN PATENT DOCUMENTS

| | | |
|---|---|---|
| JP | 2001-153960 A | 6/2001 |
| JP | 2002-40150 A | 2/2002 |
| JP | 2008-168110 A | 7/2008 |

OTHER PUBLICATIONS

N. Iida, "X-ray Grids Made Easy to Understand," Japanese Journal of Radiological Technology, Jun. 1999, pp. 529-535.

* cited by examiner

*Primary Examiner* — Carl Arbes
(74) *Attorney, Agent, or Firm* — McDermott Will & Emery LLP

(57) ABSTRACT

Problems Solved
The information solves the problem of how to provide a structure and a manufacturing method that can inexpensively and stably obtain a scattered X-ray eliminating grid wherein air serves as an intermediate substance even as X-ray absorbing substance parts are accurately positioned and held. Solution
The invention includes disposing guide slit plate mechanisms fixed relative to one another, namely, parallel to and spaced apart from one another by a prescribed distance; fitting metal foils, which serve as X-ray absorbing substance provided between the guide slit plate mechanisms, parallel to primary X-rays; inserting both ends of the metal foils into the guide slit plate mechanisms; inserting, when applying tension evenly, a rod, which is sheathed in an elastic body, into holes formed in the metal foils on the tip sides of the metal foils beyond the inserted portions; and adopting a structure that ensures that the cross sectional shape of the elastic body sheathing the rod has a sufficient wall thickness in a direction in which the elastic body is compressed when tension is generated, and thereby eliminating any difference in the tension even if a spring constant k that is determined during compression is small and the amounts of compression are different.

1 Claim, 2 Drawing Sheets

MANUFACTURING METHOD OF SCATTERED RADIATION REMOVING GRID

CROSS REFERENCE TO RELATED APPLICATIONS

This application is a National Stage application under 35 U.S.C. §371, of International Application PCT/JP2008/063127 filed on Jul. 22, 2008, which was published as WO 2010/010607 on Jan. 28, 2010. The application is incorporated herein by reference.

FIELD OF THE INVENTION

The present invention relates to a method of manufacturing a scattered, radiation eliminating grid, and more particularly relates to a method of manufacturing a scattered radiation eliminating grid wherein air serves as an intermediate substance.

BACKGROUND OF THE INVENTION

For example, in an X-ray radiographic apparatus or an X-ray CT apparatus used in medical or industrial settings, a scattered X-ray eliminating grid is generally disposed between a subject and an X-ray detector with the goal of preventing X-rays scattered, by the subject from impinging the X-ray detector.

This type of grid comprises numerous foil shaped. X-ray absorbing substance, which are made of lead and the like, and intermediate substance, which are interposed as spacers between the foil shaped. X-ray absorbing substance; furthermore, the X-ray absorbing substance are disposed parallel to the primary X-rays. In a regular X-ray fluoroscopic apparatus, an X-ray CT apparatus, or the like, wherein an X-ray tube serves as the radiation source, a so-called focused grid is used wherein the foil shaped X-ray absorbing substance are disposed such that their surfaces extends toward and focuses on one straight line disposed at a focal distance. In addition, in special applications, a parallel grid, wherein the foil shaped X-ray absorbing substance are disposed parallel to one another, is also used.

Aluminum, a paperlike fiber, or the like is often used as the intermediate substance, and any one of these may be adopted in practical use (e.g., refer to Iida, Noboru. "X-ray Grids Made Easy to Understand." *Japanese Journal of Radiological Technology* (June 1999): 529-535).

Here, however, because intermediate substances such as aluminum, fiber, or the like absorb primary X-rays, the amount of X-rays with which the subject is exposed must be increased commensurately. To compensate for this, within the conventional art, a number of proposals have been made for grids wherein air serves as the intermediate substance (e.g., refer Japanese Unexamined Patent Application Publication No. 2002-40150).

In such proposals, a structure is adopted wherein multiple pins, which are substantially parallel to one another and spaced apart by a spacing, are arrayed at portions opposing a frame that forms the outer frame of a grid, and tape, which serves as an X-ray absorbing substance, is successively applied, to and wound around, each pin. In these proposals, the tape that serves as the X-ray absorbing substance is made of polyethylene terephthalate resin and is coated with tungsten powder.

In addition, already under consideration is an even more practical proposal, namely, a scattered X-ray eliminating grid wherein; guide slit plates are disposed such that they are fixed relative to one another, namely, parallel to and spaced apart from one another by a prescribed distance; in each guide slit plate, numerous guide slits are formed and numerous metal foils, which serve as the X-ray absorbing substance provided between the guide slit plates, are fitted in the numerous guide slits such that they are parallel to the primary X-rays; and both ends of the metal foils are inserted into opposing guide slits of each of the guide slit plates such that the metal foils are held on the outer sides of the slits and an urging means applies tension to one end or both ends of the metal foils. In this proposal, a tension rod and a fixed rod, which is sheathed in an elastic tube (e.g., a silicon tube), are inserted and pulled through holes in each of the metal foils; thereby, any variation in the hole-to-hole spacing of the metal foils is absorbed, and tension is exerted evenly over all of the metal foils.

Nevertheless, in the urging means of the proposal discussed above, while the diameter of the hole in each of the metal foils is limited, the diameter of the fixed rod must be large enough to ensure its rigidity; as a result, the outer diameter and the inner diameter of the elastic tube is minimized, and the thickness of the cross section of the elastic tube is extremely small; namely, the spring constant k, which is determined when the elastic tube is compressed, is large. Accordingly, if there is any variation in the hole-to-hole spacing of the metal foils, then when the rods are pulled the amount of compression x of the elastic tube will be large when the hole-to-hole spacing of the metal foils is short and small when the hole-to-hole spacing of the metal foils is long. Namely, because the tension is expressed by the equation $F=kx$, tension cannot be exerted, evenly over all of the metal foils if the spring constant k is large and there is variation in the hole-to-hole spacing of the metal foils, which is a problem. Consequently, the scattered X-ray eliminating grid is no longer functional because, even in the tensioned state, some of the metal foils extend perfectly straight while some are deformed, namely, curved.

The thickness of the numerous metal foils that serve as the X-ray absorbing substance is usually small, namely, several tens of microns; furthermore, if tungsten, a tungsten alloy, molybdenum, or the like is selected as the material of the metal foils, then the strength of the metal foils will be relatively high, as will the limit point at which the holes of the metal foils deform, even if the rods are inserted and pulled through the holes of each of the metal foils, which therefore is not a problem. However, if a comparatively weak material—such as lead, a lead alloy, copper, a copper alloy, iron, a ferrous alloy, or nickel—or a material of a similar strength is selected as the material of the metal foils, then the limit point at which the holes of the metal foils will deform when the rods are inserted and pulled therethrough will be low and differentially large tensions will be exerted if the hole-to-hole spacing of the metal foils is short; thereby, the holes will deform, it will no longer be possible to apply tension properly and, in the worst case, the metal foils will sever.

The present invention was conceived considering such circumstances, and it is an object of the present invention to provide a method of inexpensively and stably manufacturing a scattered X-ray eliminating grid wherein air serves as an intermediate substance even as metal foils, which serve as X-ray absorbing substance, can be accurately positioned and held.

SUMMARY OF THE INVENTION

To solve the aforementioned problems, a method of manufacturing a scattered X-ray eliminating grid according to the present invention comprises the steps of: disposing guide slit plates such that they are fixed relative to one another, namely, parallel to and spaced apart from one another by a prescribed distance; forming numerous guide slits in each guide slit plate; fitting numerous metal foils, which serve as X-ray absorbing substance provided between the guide slit plates, in the numerous guide slits such that they are parallel to primary X-rays; inserting both ends of the metal foils into opposing guide slits of each of the guide slit plates and, in that state, holding the metal foils on the outer sides of the slits in the state wherein an urging means applies tension to one end or both ends of the metal foils; bonding thin plates, which are made of a light element and serve as grid covers, to an X-ray incident side and an X-ray emergent side of the metal foils such that the thin plates cover the metal foils; removing the urging means and a fixing means of the metal foils; cutting off both ends of each of the metal foils at inner sides of the guide slit plates; and removing the metal foils from the guide slit plates on both sides; wherein, to enable the urging means to exert tension evenly over all of the metal foils, a rod, which is sheathed in an elastic body, is inserted into holes, which are formed in the metal foils on the tip sides of the metal foils beyond the inserted portions, in the state wherein vicinities of both ends of the metal foils are inserted into the guide slits, and thereby the metal foils are held and pulled; and a structure is adopted that ensures that the cross sectional shape of the elastic body sheathing the rod has a sufficient wall thickness in a direction in which the elastic body is compressed, when tension is generated, which eliminates any difference in the tension even if a spring constant k that is determined during compression is small and the amounts of compression are different.

According to the scattered X-ray eliminating grid, manufacturing method of the present invention, in the state wherein both end of the numerous metal foils, which serve as the X-ray absorbing substance, are inserted into the guide slits of the guide slit plates, which are fixed, parallel to one another, thin plates (e.g., carbon fiber sheets, aluminum sheets, or the like), which are made of a light element, that serve as grid covers are bonded—in the state wherein the urging means has been used to correct the shape of each of the metal foils by evenly applying tension to one end or both ends of each of the metal foils—at the outer sides of the slits to a primary X-ray incident side and an X-ray emergent side of the metal foils such that the grid covers cover the metal foils, and, in that state, both ends of the metal foils are cut off at the inner sides of the guide slit plates, the metal foils to which the grid covers are bonded are removed, and thereby a grid is achieved wherein air serves as the intermediate substance; therefore, compared with the case wherein aluminum, fiber, or the like is used as the intermediate substance, the transmittance of the primary X-rays can be improved and the exposure dose of the subject can be reduced, commensurately.

In addition, according to the scattered X-ray eliminating grid manufacturing method of the present invention, even if a relatively low strength material, such as lead, a lead alloy, copper, a copper alloy, iron, a ferrous alloy, or nickel, or a material of a similar strength is selected as the thin metal foil material that serves as the X-ray absorbing substance, the holes of the metal foils do not deform because the rod can be inserted into the holes of the metal foils and evenly pulled, the positioning and the shape of the metal foils can be corrected reliably, and a scattered X-ray eliminating grid wherein air serves as the intermediate substance can be manufactured stably and inexpensively.

DETAILED DESCRIPTION OF THE PREFERRED EMBODIMENTS

An embodiment of the present invention is explained below, referencing the drawings.

Figure 1:
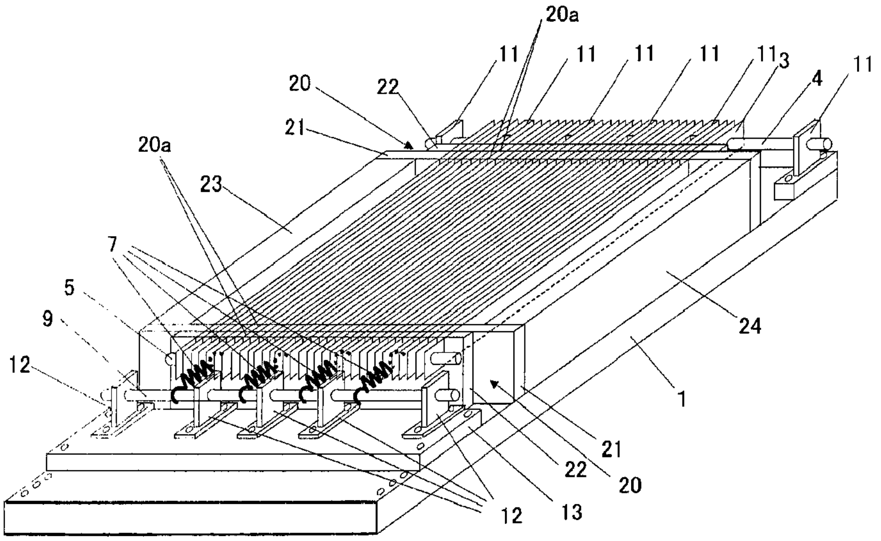
FIG. 1 is an oblique view of an embodiment of the present invention.
Figure 2:
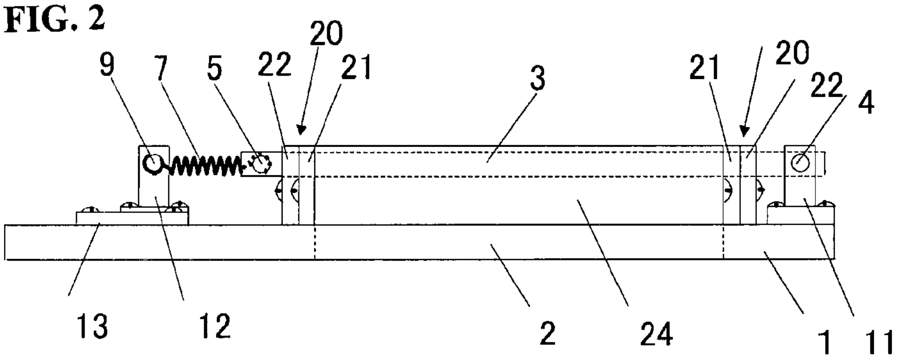
FIG. 2 is a cross sectional view of FIG. 1.

FIG. 1 is an oblique view used, to show a process of manufacturing a scattered X-ray eliminating grid, and FIG. 2 is a side view thereof.

Support members 23, 24 are fixed to an upper surface of a rectangular frame 1, which has a slotted space 2, at two sides orthogonal to two opposing sides of the frame 1. In each guide slit mechanism 20, end parts of a guide slit plate 21 are fixed to end parts of the support members 23, 24, and a guide slit plate 22 is fixed, to the guide slit plate 21 such that the guide slit plate 21 and the guide slit plate 22 overlap in the plate thickness directions. The guide slit plate 22 is screwed to the guide slit plate 21 and the screwing through hole has a requisite clearance for that screw; furthermore, within the range of this clearance, the position of the guide slit plate 22 with respect to the guide slit plate 21 can be varied in the width directions of guide slits 20*a*.

Each guide slit mechanism 20 comprises the two guide slit plates 21, 22, each of which has the same number of the guide slits 20*a* formed therein with the same pitch; furthermore, the width of each of the guide slits 20*a* of the guide slit plates 21, 22 is considerably greater than the thickness of metal foils 3. Of the guide slit plates 21, 22, the guide slit plate 21 is fixed to the frame 1 and the guide slit plate 22 is fixed to the guide slit plate 21.

When using the abovementioned guide slit mechanisms 20 to position the metal foils 3, which serve as the X-ray absorbing substance, first, both ends of each of the metal foils 3 are inserted in the guide slit plates 21, 22 of the guide slit mechanisms 20 such that these ends substantially coincide with the positions of the guide slits 20*a*; subsequently, the guide slit plates 22 are moved in the width directions of the guide slits 20*a*, the metal foils 3 are inserted without gaps into the guide slit plates 21, 22, and, in that state, the guide slit plates 22 are fixed to the guide slit plates 21. Thereby, both ends of each of the metal foils 3 are guided into the guide slit mechanisms 20 without gaps.

Here, each of the guide slits 20*a* is formed with a spacing, an attitude, and a length such that the metal foils 3, which are inserted into the guide slits 20*a*, are disposed parallel to X-rays that radiate from an X-ray focal point F based on a preset focal length (e.g., 120 cm) and such that a grid with a set grid ratio (e.g., 10) is formed. The width of each of the guide slits 20*a* is formed by precision machining, such as by CN electric discharge machining.

In the state wherein the vicinities of both end parts of the metal foils 3 are inserted in the guide slits 20*a* of the guide slit mechanisms 20, a fixed rod 4 and a tension rod 5 are inserted in holes 25 (see FIG. 3) which are formed, in the metal foils 3 on the tip sides of the metal foils 3 beyond the inserted portions, and thereby the metal foils 3 are held by the fixed rod 4 and the tension rod 5. The material of the metal foils 3 is not particularly limited as long as its material properties include the required X-ray absorption coefficient; in the present example, molybdenum foils are used.

Regarding the fixed rod 4 and the tension rod 5, the fixed rod 4 is fixed to the frame 1 via fixing brackets 11. A plurality of fixing brackets 11 are disposed—one fixing bracket 11 every number of the numerous metal foils 3—such that, during pulling, the fixed rod 4 is fixed as is and maintains its straightness without curving; furthermore, the fixed rod 4 passes through holes of the fixing brackets 11 and thereby is supported. In addition, the tension rod 5 is not fixed to the frame 1.

One end of each extension coil spring 7 of a plurality of extension coil springs 7 engages with the tension rod 5 and another end of each of the extension coil springs 7 engages with a support rod 9, which is fixed parallel to the tension rod 5. The plurality of extension coil springs 7 is disposed such that the extension coil springs 7 engage with the tension rod 5 every number of the numerous metal foils 3 such that, when pulled under tension, the tension rod 5 maintains its straightness without curving. In addition, fixing brackets 12 are disposed, between the coil springs 7 such that, when the support rod 9 is under tension, it is likewise fixed such that it maintains its straightness without curving; furthermore, the support rod 9 passes through holes of the fixing brackets 12 and is thereby supported. Here, the fixing brackets 12 are fixed to and disposed on a movable pedestal 13; furthermore, sliding the movable pedestal 13 on the frame 1 pulls and thereby exerts tension on each of the metal foils 3.

Figure 3:
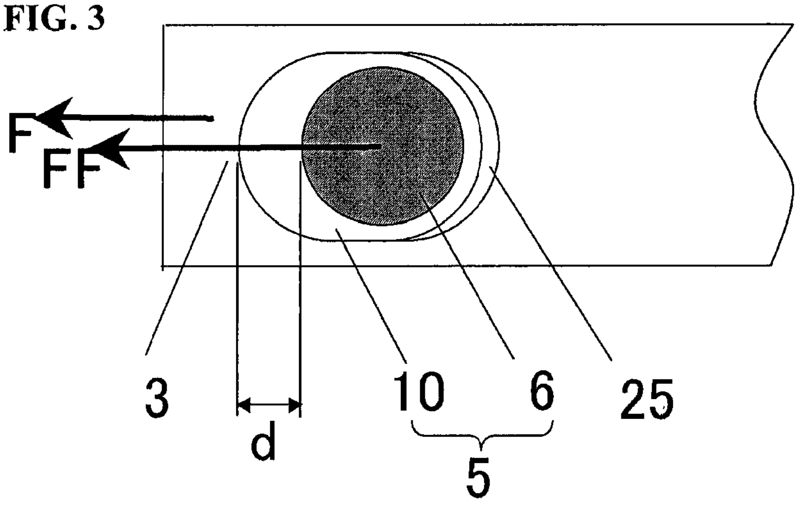
FIG. 3 is a detailed, drawing of the cross sectional shape of a tension rod 5 in the embodiment of FIG. 1.

Here, owing to hole diameter fabrication errors, hole spacing fabrication errors, errors owing to deformation of the holes caused by tension, layout errors, and the like, variation arises in the spacings of the holes 25 of the metal foils 3 inserted into the guide slits 20*a* and disposed such that the metal foils 3 are pulled. Even in such a state, to exert tension evenly over all of the metal foils 3 and to absorb errors in the tension rod 5, the tension rod 5 must have a configuration wherein a metal core 6 is sheathed, in an elastic tube 10; FIG. 3 shows the details of the cross sectional shape thereof.

Figure 4:
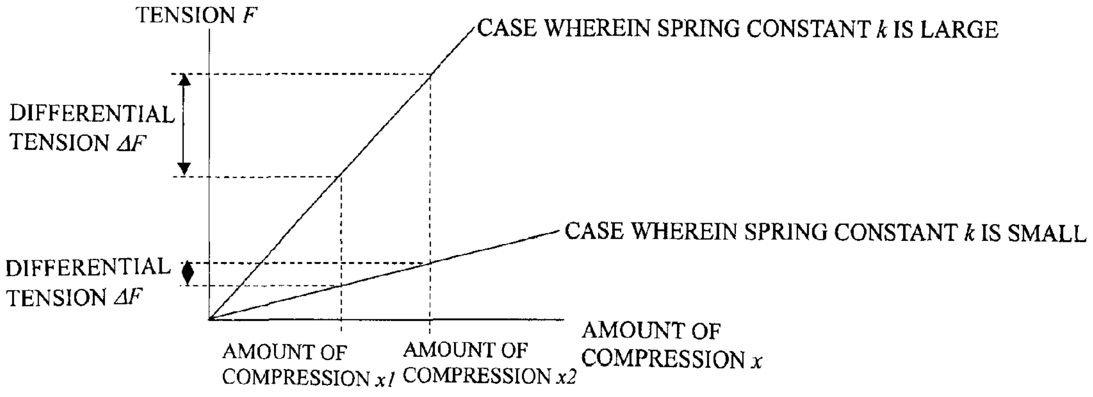
FIG. 4 is a graph that plots the tension F=kx applied to metal foils 3 in the embodiment of FIG. 1.

As shown in FIG. 3, a structure is adopted that ensures that, when a tensile force FF is generated, the cross sectional shape of the elastic tube 10 sheathing the metal core 6 inside the tension rod 5 has a sufficient thickness with respect to a wail thickness d in the direction in which the elastic tube 10 is compressed between the metal core 6 and the metal foil 3. In the case of the present embodiment, the outer side of the elastic tube 10 is shaped as an ellipse and the inner side is shaped as a true circle disposed slightly eccentrically. Accordingly, the hole 25 of each of the metal foils 3 is likewise shaped as an ellipse. If the spring constant of the wall thickness d portion of the elastic tube 10, which is determined when the elastic tube 10 is compressed, is k, then the spring constant k is small when the wall thickness d is large, and the spring constant k is large when the wall thickness d is small. If the amount of compression is given as x, then the tension applied to each of the metal foils 3 is expressed, by F=kx; FIG. 4 graphs this aspect. As shown in the Figure, when there is variation in the hole-to-hole spacing of the metal foils 3 and a difference arises, for example, in amounts of compression x1, x2 for the given wall thickness d of the elastic tube 10, then a differential tension ΔF is large when the spring constant k is large and the differential tension ΔF is small when the spring constant k is small. Namely, in the conventionally proposed urging means, the outer diameter and the inner diameter of an elastic tube is minimized and the cross sectional wall thickness of the elastic tube is extremely small, in which case the spring constant k is large and therefore the differential tension ΔF is large; however, in the present embodiment, if a sufficient wall thickness d of the elastic tube 10 is ensured, then the spring constant k is small and therefore the differential tension ΔF is small If the wall thickness d of the elastic tube 10 is sufficient as described above, then, even if variation arises owing to, for example, error in the metal foils 3 as discussed above, error in the tension rod 5 can be sufficiently absorbed and tension can thereby be evenly exerted over all of the metal foils 3.

Figure 5:
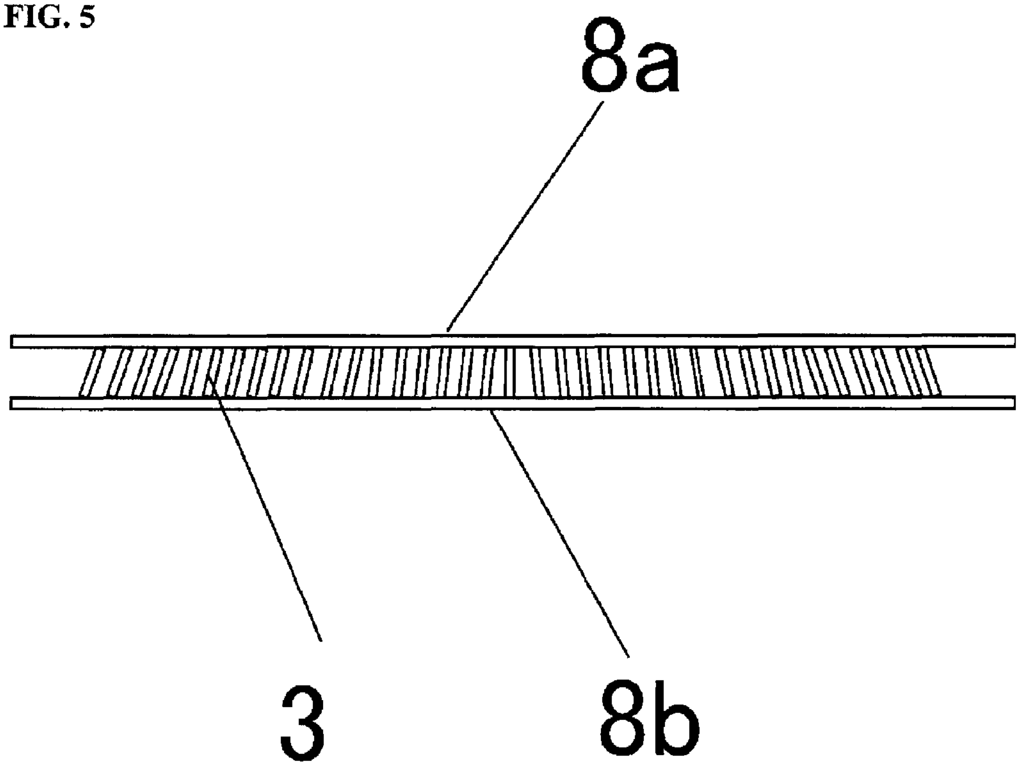
FIG. 5 is a side view of a scattered X-ray eliminating grid obtained by the embodiment of the present invention.

Grid covers 8*a*, 8*b*, which are made of, for example, carbon fiber sheeting, are directly bonded, in a state wherein the positioning, shape, and attitude of the metal foils 3 are corrected as described above, with an adhesive to the metal foils 3 such that the X-ray incident side and the X-ray emergent side of each of the metal foils 3 is covered, the grid covers 8*a*, 8*b* are then cut in that state at the inner sides of the guide slit mechanisms 20, and the metal foils 3 whereto the grid covers 8*a*, 8*b* are bonded are removed. Thereby, as shown by the side view in FIG. 5, a scattered X-ray eliminating grid is obtained that comprises the numerous metal foils 3 and the upper and lower grid covers 8*a*, 8*b*.

In addition, the above embodiment explained an exemplary case wherein the present invention is adapted, to a focused grid, but the present invention is not limited, thereto; for example, the present invention can naturally also be adapted to a parallel grid wherein each of the metal foils 3 are parallel to one another.

Furthermore, each of the above embodiments explained an exemplary case that provides extension coil springs 7 that serve as urging means to only one end and the tension rod 5, wherein the elastic tube 10 sheaths the metal core 6, but the present invention is not limited thereto; for example, the urging means may be provided to both ends; in addition, needless to say, some other elastic member may be used as the urging means.

The invention claimed is:

1. A method of manufacturing a scattered X-ray eliminating grid, comprising the steps of:

disposing guide slit plates such that they are fixed relative to one another, namely, parallel to and spaced apart from one another by a prescribed distance;

forming numerous guide slits in each guide slit plate;

fitting numerous metal foils, which serve as an X-ray absorbing substance provided between the guide slit plates, in the numerous guide slits such that they are parallel to primary X-rays;

inserting both ends of the metal foils into opposing guide slits of each of the guide slit plates and, in that state, holding the metal foils on the outer sides of the slits in the state wherein an urging means applies tension to one end or both ends of the metal foils;

bonding thin plates, which are made of a light element and serve as grid covers, to an X-ray incident side and an X-ray emergent side of the metal foils such that the thin plates cover the metal foils;

removing the urging means and a fixing means of the metal foils;

cutting off both ends of each of the metal foils at inner sides of the guide slit plates; and removing the metal foils from the guide slit plates on both sides;

wherein, to enable the urging means to exert tension evenly over all of the metal foils, a rod, which is sheathed in an elastic body, is inserted into holes, which are formed in the metal foils on the tip sides of the metal foils beyond the inserted portions, in the state wherein vicinities of both ends of the metal foils are inserted into the guide slits, and thereby the metal foils are held and pulled; and a structure is adopted that ensures that the cross sectional shape of the elastic body sheathing the rod has a sufficient wall thickness in a direction in which the elastic body is compressed when tension is generated, which eliminates any difference in the tension even if a spring constant k that is determined during compression is small and the amounts of compression are different.

* * * * *